United States Patent
Scheidt et al.

(10) Patent No.: US 6,363,897 B2
(45) Date of Patent: Apr. 2, 2002

(54) DEVICE FOR CHANGING THE CONTROL TIMING OF THE GAS EXCHANGE VALVES OF AN INTERNAL COMBUSTION ENGINE, IN PARTICULAR A HYDRAULIC CAMSHAFT ADJUSTMENT DEVICE OF THE ROTARY PISTON TYPE

(75) Inventors: Martin Scheidt, Adelsdorf; Jens Schafer, Herzogenaurach; Matthias Kapp, Hemhofen; Martin Steigerwald, Herzogenaurach, all of (DE)

(73) Assignee: INA Walzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/747,076

(22) Filed: Dec. 22, 2000

(30) Foreign Application Priority Data

Dec. 24, 1999 (DE) .......................... 199 62 981

(51) Int. Cl.$^7$ ............................... F01L 1/344
(52) U.S. Cl. ................ 123/90.17; 123/90.37; 74/568 R; 464/2
(58) Field of Search .............. 123/90.15, 90.17, 123/90.31, 90.34, 90.37; 74/568 R; 464/1, 2, 160

(56) References Cited

U.S. PATENT DOCUMENTS 5,566,651 A * 10/1996 Strauss et al. ............ 123/90.17
5,727,508 A * 3/1998 Goppelt ..................... 123/90.17
5,988,126 A * 11/1999 Strauss et al. ............ 123/90.17
6,085,708 A * 7/2000 Trzmiel et al. ........... 123/90.17
6,170,447 B1 * 1/2001 Kohrs et al. .............. 123/90.17

FOREIGN PATENT DOCUMENTS

DE          19808619 A1        9/1999

* cited by examiner

*Primary Examiner*—Weilun Lo
(74) *Attorney, Agent, or Firm*—Volpe and Koenig, P.C.

(57) ABSTRACT

A hydraulic camshaft-adjusting device of the rotary piston type having a drive gear (2) and an impeller. The drive gear (2) has a cavity formed from a perimeter wall and two side walls (5, 6) inside of which at least one hydraulic working chamber is formed from at least two boundary walls (8). The impeller has a wheel hub (10) with at least one vane that extends into a working chamber, dividing the chamber into two associated hydraulic pressure chambers. The pressure medium feed to and from the pressure chambers is done using a pressure medium tap (16) on the side facing a camshaft as well as using pressure medium channels (17) incorporated into the axial sides (14, 15) of the wheel hub (10) of the impeller, which are connected to the pressure medium tap through a pressure medium distributor (20). The pressure medium tap (16) and the pressure medium distributor (20) are encircled at the head (19) and the outer surface (21) by a respective penetration (22, 23) in the side walls (5, 6) of the drive gear (2). The gaps between the head (19) of the pressure medium distributor (20) at the penetration (22) of the one side wall (5) of the drive gear (2) and between the outer surface (21) of the pressure medium tap (16) and the penetration (23) at the other side wall (6) of the drive gear (2) are sealed off through wear-resistant sealing media against pressure medium leakage

3 Claims, 3 Drawing Sheets

B - B

B - B

DEVICE FOR CHANGING THE CONTROL TIMING OF THE GAS EXCHANGE VALVES OF AN INTERNAL COMBUSTION ENGINE, IN PARTICULAR A HYDRAULIC CAMSHAFT ADJUSTMENT DEVICE OF THE ROTARY PISTON TYPE

BACKGROUND

The invention pertains to a device for changing the control timing of gas exchange valves of an internal combustion engine, which is particularly advantageous for application in hydraulic camshaft adjusting devices of the rotary piston type.

A device of this type is known from German patent DE 198 08 619 A1, which generally defines this class. This device, designed as a so-called vane-cell positioning device is formed essentially of a drive gear directly connected to a crankshaft of the internal combustion engine and an impeller that is directly connected to a camshaft of the internal combustion engine. The drive gear has a cavity formed by a hollow cylindrical perimeter wall and two sidewalls, inside of which four hydraulic working chambers are formed from four boundary walls. The impeller has at the perimeter of its wheel hub four vanes, each of which extends radially into a working chamber of the drive gear. These four vanes divide each of the working chambers into two counteracting hydraulic pressure chambers. By selectively or simultaneously applying pressure using a hydraulic pressure medium, these pressure chambers effect a pivoting motion or a fixing of the impeller with respect to the drive gear, and thus the camshaft with respect to the crankshaft. The pressure medium feed to and from the pressure chambers of this device is done by means of a pressure medium tap lying at the axial side of the wheel hub of the impeller facing the camshaft, which is designed as a specialized pressure medium adapter, from a camshaft bearing in the cylinder head of the internal combustion engine. It is also done using pressure medium channels incorporated into both axial sides of the wheel hub of the impeller. These pressure medium channels are connected to the pressure medium tap through a pressure medium distributor penetrating the impeller along its longitudinal axis that is designed in this device as a specialized pressure medium feed bushing. One end of the bushing lies against the axial side of the wheel hub of the impeller that is facing away from the camshaft. The pressure medium tap and the pressure medium distributor are, just as the impeller is, directly bolted to the camshaft by means of a central fastening screw and are each partially enclosed at the head and at the outer surface by a coaxial penetration in the side walls of the drive gear. The gap between the head of the pressure medium distributor and the penetration in the one side wall of the drive gear is sealed against external pressure media leakage by an O-ring in an annular notch in the head of the pressure medium distributor, whereas the gap between the outer surface of the pressure medium tap and the penetration in the other side wall of the drive gear is designed as a sealing gap.

The disadvantage in this known device is that, on the one hand, relatively large play must exist between the head of the pressure medium distributor and the penetration in the one side wall of the drive gear as well as between the outer surface of the pressure medium tap and the penetration in the other side wall of the drive gear so as to prevent a bearing site from occurring at these places. On the other hand, however, the external pressure medium leakages through the gaps at these places are limited, mainly so that less pressure medium has to be fed in the controlled positions of the camshaft-adjusting device. In practice, the O-rings used and the sealing gaps have proven to be unsuitable as a means to seal gaps since the pressure medium channels to the pressure chambers of the device are incorporated into the axial sides of the wheel hub of the impeller. Thus, the pressure of the pressure medium is felt repeatedly at the perimeter of the gaps depending on the number of pressure chambers. As a result, in sealing gaps, the external pressure medium leakages are always still too high, whereas O-rings are so highly compressed by the pressure of the pressure medium that the friction between the pressure medium distributor and the side wall of the drive gear increases. This then leads to higher wear of the O-rings and in the worst case to a worsening of the adjustment speed of the camshaft-adjustment device. Moreover, O-rings have also been shown to be disadvantageous with respect to their embrittlement at high and low temperatures as well as with respect to their incidence of tears and other damage.

SUMMARY

The object of this invention is to provide a device for changing the control timing of gas exchange valves of an internal combustion engine, in particular a hydraulic camshaft adjustment device of the rotary piston type, whereby the disadvantages of the known state of the art, are avoided, such as the external pressure medium leakages through the gap between the head of the pressure medium distributor and the penetration of the one side wall of the drive gear and between the outer surface of the pressure medium tap and the penetration of the other side wall of the drive gear are reduced to a minimum.

According to the invention, this object is met by a device in that the gap between the head of the pressure medium distributor and the penetration of the one side wall of the drive gear and between the outer surface of the pressure medium tap and the penetration of the other side wall of the drive gear are sealed off against pressure medium leakage using wear-resistant sealing media.

In a first advantageous embodiment of the device according to the invention, these sealing media are provided preferably as slitted steel sealing rings or as lamellar sealing rings which are each placed in a circular radial notch in the head of the pressure medium distributor and in the outer surface of the pressure medium tap.

Here, the pressure medium distributor is preferably formed from a specialized pressure medium guide bushing that coaxially penetrates the impeller. This feed bushing has at one end a bushing head in which the one radial circular notch for the steel or lamellar sealing ring is located. On the other hand, the pressure medium tap is preferred to be formed by a pressure medium adapter placed onto the other end of the pressure medium feed bushing. It has in its outer surface the other radial circular notch for the steel or lamellar sealing rings. With the help of a central fastening screw passing through the pressure medium feed bushing, the pressure medium tapped from the pressure medium adapter, for example directly from a camshaft bearing in the cylinder head of the internal combustion engine, can on the one hand be thereby passed on along the outside and on the other hand along the inside of the pressure medium feed bushing in respective circular channels incorporated into the axial sides of the wheel hub of the impeller. These channels are connected to the pressure chambers of the device through other pressure medium channels on the wheel hub of the impeller.

However, it is also possible to form the pressure medium distributor, instead of through a specialized pressure medium feed bushing, by the fastening screw itself, drilled out axially hollow, and to incorporate one of the radial circular notches for the steel or lamellar sealing rings into the head of this screw and/or instead of a specialized pressure medium adapter to design the drive end of the camshaft itself as a pressure medium tap. The other radial circular notch for the steel or lamellar sealing rings is then located in its outer surface. The pressure medium feed to the pressure chambers of the device is done in the same manner as in the described design described previously, wherein the pressure medium tap for both designs can come not only directly from a bearing of the camshaft, but also indirectly from another non-rotating pressure medium feed at the cylinder head of the internal combustion engine. Independent of the respective design of the pressure medium distributor and the pressure medium tap, it is moreover also possible to incorporate the surrounding radial circular notches for the steel or lamellar sealing rings into the respective coaxial penetrations in the sidewalls of the drive gear. In the preferably used slitted steel sealing rings, those with straight, slanted or overlapping joints as well as those with cylindrical or hooked joints can be used, with the latter being characterized by an increase in density. The cross sections of the steel sealing rings are preferred here to be square, trapezoidal, round or oval, where the contact surfaces of the steel sealing rings can be designed flat or round. In contrast, depending on the required density, either simple lamellar sealing rings as well as double or multiple layer sealing rings can be used. It is, however, also possible to use un-slitted sealing rings, in particular those made of plastic or similar, as wear-resistant sealing media in the radial circular notches.

As a second advantageous form of the device according to the invention, it is moreover suggested that the sealing media be preferably provided as circular sealing washers that cover the gap between the head of the pressure medium distributor and the penetration in the one side wall of the drive gear and between the outer surface of the pressure medium tap and the penetration in the other side wall of the drive gear by placing them into corresponding circular axial notches. The circular axial notches for the sealing washers are formed by machining out recesses in the penetrations of the sidewalls both at the head of the pressure medium distributor and at the outer surface of the pressure medium tap.

In this embodiment, as well, it has proven advantageous to construct the pressure medium distributor as a pressure medium guide bushing that coaxially penetrates the impeller with a bushing head, on whose axial surface lying against the wheel hub of the impeller a recess is machined that forms one part of the one axial circular notch. In using a hollow-drilled fastening screw as the pressure medium distributor, which is also possible here, the recess forming one part of the circular axial notch can be incorporated into the axial surface of the screw head lying against the wheel hub of the impeller in an equivalent manner. The other part of the circular axial notch is, however, formed from a complementary recess in the penetration of the one side wall of the drive gear encircling the bushing head, independent in either case of the design of the pressure medium distributor. A recess incorporated into the penetration of the other sidewall of the drive gear in the same manner forms one part of the other circular axial notch, moreover, whereas the complementary other part of this circular axial notch is formed into the axial surface of a specialized pressure medium adapter, also preferred to be used as a pressure medium tap here, which lies against the wheel hub of the impeller. It can also be formed into the axial surface of the drive end of the camshaft itself.

The circular sealing washers used in this embodiment are preferably made as steel sealing washers with a square cross sectional profile. However, sealing washers made of other materials, such as sintered steel, cast iron brass, copper, aluminum, plastics, Teflon or the like can be used with trapezoidal, round or oval cross sectional profiles. It is also possible to provide the circular sealing washers with surface treatments or layers by selective phosphating, ferro-oxidation, tinning, copper plating, nitrating, nitrocarborization, chromating or by molybdenum or plastic layering. These layers can also be designed as metallic, ceramic or metal-ceramic mixed layers. Also, those types of devices should be included under the protective scope of the invention that are a combination of the first and second embodiments described used as the sealing medium. Moreover, the invention is suitable not only for installation in any kind of rotary piston positioner, but also for those types of camshaft adjusters that pertain to the principle of an orbiting slow-moving hydromotor.

Thus, the device designed according to the invention to change the control timing of gas exchange valves of an internal combustion engine, in particular a hydraulic camshaft adjustment device of the rotary piston type, has, in both suggested embodiments, the advantage as compared to devices known from the state of the art in that by using wear-resistant sealing rings or sealing washers, the external pressure medium leakages through the gap between the head of the pressure medium distributor and the penetration of the one side wall of the drive gear and between the outer surface of the pressure medium tap and the penetration of the other side wall of the drive gear are reduced considerably. This has the advantage in that to hold the camshaft adjustment device in its controlled position, less pressure medium has to be fed and that at the same time its stability increases since the friction between the sealing rings or sealing washers and their contact surfaces is considerably less than previously known O-rings, in particular at higher compression at the tolerance limits. Moreover, the sealing rings or sealing washers arranged according to the invention make installation of the device easier since they can not twist when installed, in contrast to O-rings, and in addition are subject neither to tears or other damage nor to embrittlement at high or low temperatures.

BRIEF DESCRIPTION OF THE DRAWINGS

The invention is explained in more detail below based on the two preferred embodiments disclosed herein. In the appended drawings, the following is shown:

FIG. 2 is a section taken along line B—B of FIG. 1 with a first embodiment of a

DETAILED DESCRIPTION OF THE PREFERRED EMBODIMENTS

Figure 1:
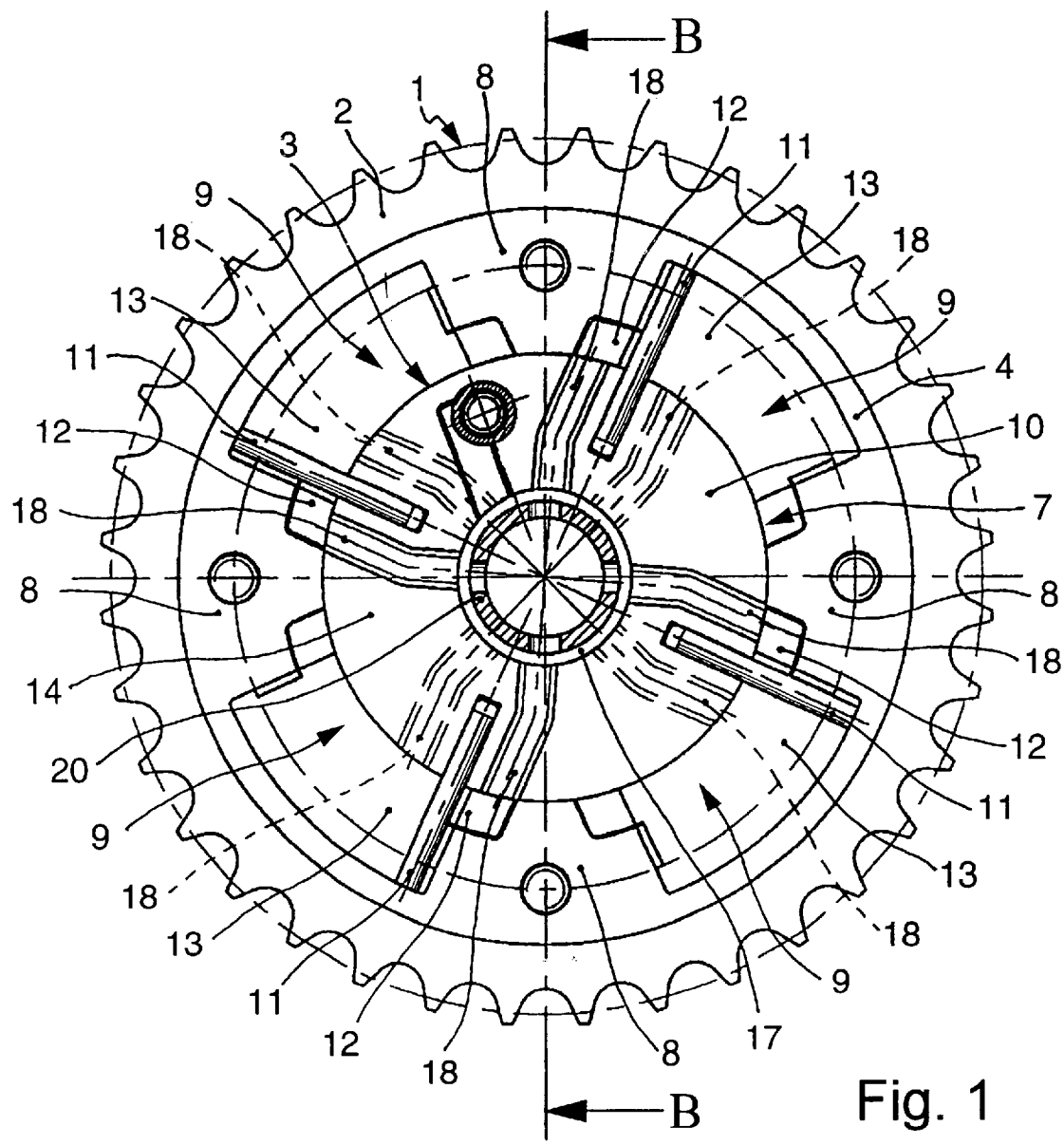
FIG. 1 is a front view of a camshaft adjustment device according to the invention taken along section A—A of FIG. 2.
Figure 2:
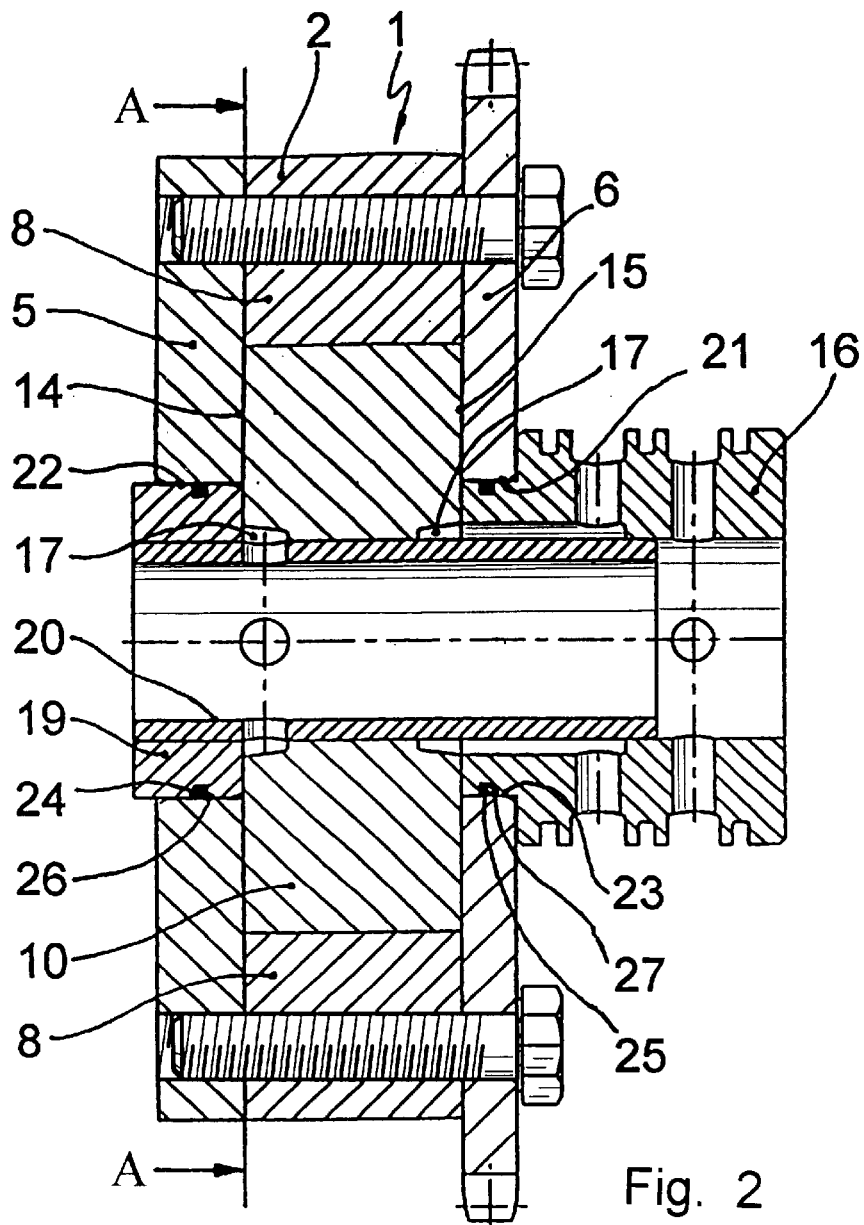

FIG. 1 shows a device 1 designed as a hydraulic camshaft adjustment device of the rotary piston type that is used to change the control timing of gas exchange valves of an internal combustion engine. This device 1 is formed essentially of a drive gear 2 directly connected to a crankshaft (not shown) of an internal combustion engine and of an impeller 3 directly connected to a camshaft (also not shown) of the internal combustion engine. The drive gear 2 has, as seen in FIGS. 1 and 2, a cavity 7 formed from a hollow cylindrical perimeter wall 4 and two side walls 5, 6, inside of which four working chambers 9 are formed from four boundary walls 8. The impeller 3 has at the perimeter of its wheel hub 10 four vanes 11 extending radially into the working chambers 9 of the drive gear 2. These vanes divide each of the working chambers into two hydraulic pressure chambers, 12 and 13, which counteract each other. These pressure chambers 12, 13 effect a pivoting motion or a fixing of the impeller 3 with respect to the drive gear 2, and thus of the camshaft with respect to the crankshaft, by selectively or simultaneously applying pressure through a hydraulic medium.

Further, it can be seen from FIGS. 1 and 2, that the pressure medium feed to and from the pressure chambers 12 and 13 of the device 1 is done by means of a pressure medium tap 16 lying against the axial side 15 of the wheel hub 10 of the impeller 3 facing the camshaft, which is designed as a specialized pressure medium adapter, as well as by means of pressure medium channels 17, 18 incorporated into both axial sides 14, 15 of the wheel hub 10 of the impeller 3. The pressure medium tap 16 and the pressure medium channels 17, 18 are connected to one another through a pressure medium distributor 20 that penetrates the impeller 3 along its longitudinal axis and that is designed as a specialized pressure medium feed bushing. The head 19 of this pressure medium distributor lies against the axial side 14 of the wheel hub 10 of the impeller 3 facing away from the camshaft. Then, using a central fastening screw, not shown, the pressure medium tap 16 and the pressure medium distributor 20 are bolted together with the impeller 3 to the camshaft, whereupon they are partially enclosed at the head 19 and the outer surface 21 by an associated coaxial through penetration 22, 23 in the side walls 5, 6 of the drive gear 2.

To prevent external pressure medium leakages through the gap between the head 19 of the pressure medium distributor 20 and the penetration 22 of the one side wall 5 of the drive gear 2, as well as between the outer surface 21 of the pressure medium tap 16 and the penetration 23 of the other side wall 6 of the drive gear 2, these gaps are sealed off using wear-resistant sealing media according to the invention.

Figure 2A:
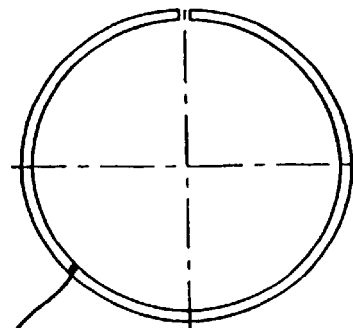
FIG. 2A is a detailed view of the slitted steel sealing ring used in the first embodiment of the invention shown in FIG. 2.

The sectional representation of the device 1 shown in FIG. 2 shows that these sealing media are designed in a first embodiment as slitted steel sealing rings 24, 25 that are each placed into a circular radial notch 26, 27 in the head 19 of the pressure medium distributor 20 and in the outer surface 24 of the pressure medium tap 16. The embodiment shown individually in FIG. 2A has proven to be the most cost-effective, and includes by a straight joint as well as a square cross sectional profile with a flat contact surface.

Figure 3:
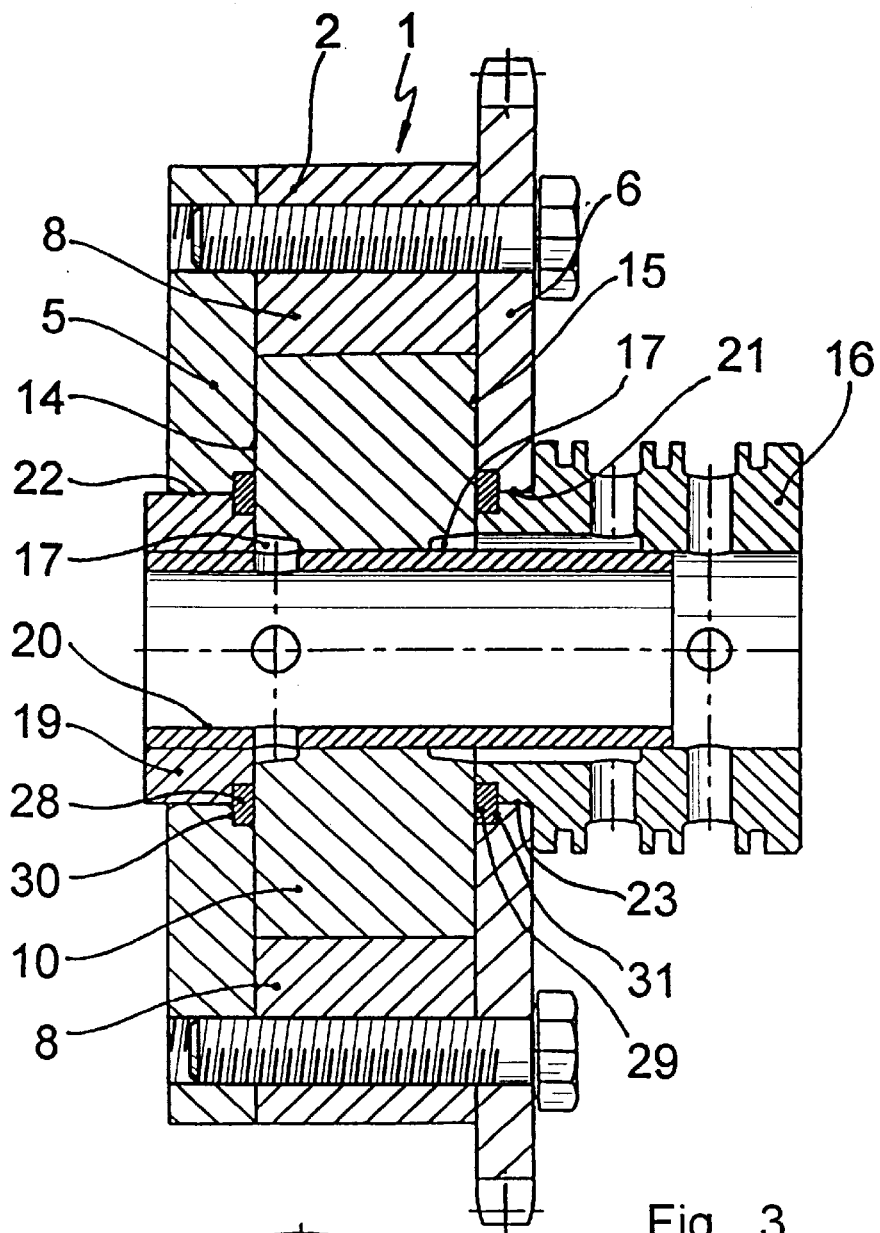
FIG. 3 is a section taken along line B—B of FIG. 1 with a second embodiment of a camshaft adjustment device according to the invention.
Figure 3A:
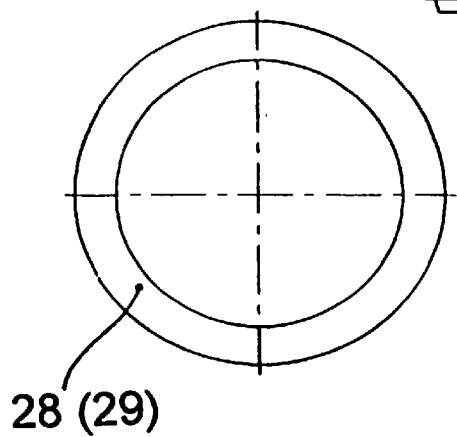
FIG. 3A is a detailed view of the circular sealing washer used in the second embodiment of the invention shown in FIG. 3.

In the alternative embodiment shown in FIG. 3, the sealing media are, in contrast, provided as circular sealing washers 28, 29 of the specialized depicted type shown in FIG. 3A. These cover the gap between the head 19 of the pressure medium distributor 20 and the penetration 22 of the one side wall 5 as well as between the outer surface 21 of the pressure medium tap 16 and the penetration 23 of the other side wall 6. These circular sealing washers, 28 and 29, formed in a cost-effective form of steel and having a square cross sectional profile, are placed into circular axial notches 30, 31 that are formed by machining out recesses at the penetrations 22, 23 of the side walls 5, 6 as well as at the head 19 of the pressure medium distributor 20 and at the outer surface 21 of the at pressure medium tap 16.

REFERENCE LIST

1 Device
2 Drive gear
3 Impeller
4 Perimeter wall
5 Side wall
6 Side wall
7 Cavity
8 Boundary walls
9 Working chamber
10 Wheel hub
11 Vane
12 Pressure chamber
13 Pressure chamber
14 Axial side facing away from the camshaft
15 Axial side facing toward the camshaft
16 Pressure medium tap
17 Pressure medium channel
18 Pressure medium channel
19 Head
20 Pressure medium distributor
21 Outer surface
22 Penetration
23 Penetration
24 Steel sealing ring
25 Steel sealing ring
26 Radial circular notch
27 Radial circular notch
28 Circular sealing washer
29 Circular sealing washer
30 Circular axial notch
31 Circular axial notch

What is claimed is:

1. A device for changing the control timing of gas exchange valves of an internal combustion engine, comprising:

a drive gear (2) adapted for direct connection to a crankshaft of the internal combustion engine and an impeller (3) adapted for direct connection to a camshaft of the internal combustion engine, the drive gear (2) has a cavity (7) formed by a hollow cylindrical perimeter wall (4) and two side walls (5, 6) inside of which at least one hydraulic working chamber (9) is formed by at least two boundary walls (8), the impeller (3) has a wheel hub (10) with at least one vane (11) at a perimeter thereof that extends radially into the working chamber (9) of the drive gear (2) that divides the working chamber (9) into two respective hydraulic pressure chambers (12, 13) that counteract one another, the pressure chambers (12, 13) are adapted to effect a pivoting motion or a fixing of the impeller (3) with respect to the drive gear (2), and thus of the camshaft with respect to the crankshaft, by selective or simultaneous application of pressure through a hydraulic pressure medium feed, a pressure medium tap (16) lying at the axial side (14 or 15) of the wheel hub (10) of the impeller (3) facing toward or away from the camshaft, and pressure medium channels (17, 18) located in both axial sides (14, 15) of the wheel hub (10) of the impeller (3) that form the pressure medium feed to and from the pressure chambers (12, 13), the pressure medium tap (16) and the pressure medium channels (17, 18) are connected to one another through a pressure medium distributor (20) penetrating the impeller (3) along a longitudinal axis thereof and lying by means of a head (19) against the axial side (15 or 14) of the wheel hub (10) of the impeller (3) facing away from or toward the camshaft, the pressure medium tap (16) and the pressure medium distributor (20) are adapted to be connected directly to the camshaft and are partially enclosed at the head (19) and an outer surface (21) of the pressure medium tap by a respective coaxial penetration (22, 23) in the side walls (5, 6) of the drive gear (2), wherein, wear-resistant sealing media are used to seal a gap located between the head (19) of the pressure medium distributor (20) and the penetration (22) of the one side wall (5) of the drive gear (2) and between the outer surface (21) of the pressure medium tap (16) and the penetration (23) of the other side wall (6) of the drive gear (2) against external pressure medium leakage.

2. A device according to claim 1, wherein the sealing media is formed as a slitted steel sealing ring (24, 25) or as a lamellar sealing ring that is located in a circular radial notch (26, 27) located in the head (19) of the pressure medium distributor (20) and in the outer surface (21) of the pressure medium tap (16).

3. A device according to claim 1, wherein the sealing media is formed as a circular sealing washer (28, 29) located in a circular axial notch (30, 31) formed as a recess at the penetration (22, 23) of the side walls (5, 6) and at the head (19) of the pressure medium distributor (20) and at the outer surface (21) of the pressure medium tap (16).

\* \* \* \* \*